US010239514B2

United States Patent
Madurai-Kumar et al.

(10) Patent No.: US 10,239,514 B2
(45) Date of Patent: Mar. 26, 2019

(54) POWER REGENERATION OPTIMIZATION IN A HYBRID VEHICLE

(71) Applicant: Cummins, Inc., Columbus, IN (US)

(72) Inventors: Mahesh Madurai-Kumar, Columbus, IN (US); Tung-Ming Hsieh, Carmel, IN (US); Pinak Tulpule, Columbus, IN (US); Praveen Chitradurga Muralidhar, Ann Arbor, IN (US); Martin T. Books, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/120,669

(22) PCT Filed: Feb. 23, 2015

(86) PCT No.: PCT/US2015/017106
§ 371 (c)(1),
(2) Date: Aug. 22, 2016

(87) PCT Pub. No.: WO2015/130614
PCT Pub. Date: Sep. 3, 2015

(65) Prior Publication Data
US 2017/0008514 A1    Jan. 12, 2017

Related U.S. Application Data

(60) Provisional application No. 61/944,375, filed on Feb. 25, 2014.

(51) Int. Cl.
*B60W 10/10* (2012.01)
*B60W 10/11* (2012.01)
(Continued)

(52) U.S. Cl.
CPC ............ *B60W 20/30* (2013.01); *B60W 10/10* (2013.01); *B60W 10/11* (2013.01); *B60W 20/15* (2016.01);
(Continued)

(58) Field of Classification Search
CPC ...... B60W 20/10; B60W 20/11; B60W 20/15; B60W 20/30; B60W 30/18127;
(Continued)

(56) References Cited

U.S. PATENT DOCUMENTS 5,720,690 A * 2/1998 Hara .................. B60K 6/48
477/20
7,502,679 B2    3/2009 Tabata et al.
(Continued)

FOREIGN PATENT DOCUMENTS

WO    WO-2012/010951    1/2012
WO    WO-2013/113103    8/2013

OTHER PUBLICATIONS

Search Report and Written Opinion for PCT/US2015/017106, dated Jun. 8, 2015, 7 pages.
(Continued)

*Primary Examiner* — Aaron L Troost
(74) *Attorney, Agent, or Firm* — Foley & Lardner LLP (57) ABSTRACT

A hybrid controller unit includes a detection module, a gear-hold module, a gear-skip module, and an optimizing module. The detection module is structured to detect a deceleration event. The gear-hold module is structured to determine whether a certain gear of a transmission should be maintained for a certain period of time in order to optimize power regeneration during the deceleration event. The gear-hold module is also structured to generate a gear-hold request. The gear-skip module is structured to determine whether the transmission should skip a gear in order to
(Continued)

optimize power regeneration during the deceleration event. The gear-skip module is also structured to generate a gear-skip request. The optimizing module is structured to receive the gear-hold request and the gear-skip request and generate a transmission command to be sent to a transmission control unit for actuation.

19 Claims, 3 Drawing Sheets (51) Int. Cl.
*B60W 20/15* (2016.01)
*B60W 20/30* (2016.01)
*B60W 30/18* (2012.01)
*F16H 59/36* (2006.01)
*F16H 59/48* (2006.01)
*F16H 59/78* (2006.01)
*F16H 61/02* (2006.01)

(52) U.S. Cl.
CPC ... *B60W 30/18127* (2013.01); *F16H 61/0213* (2013.01); *B60W 2540/10* (2013.01); *B60W 2540/12* (2013.01); *B60W 2710/1005* (2013.01); *B60W 2710/1038* (2013.01); *F16H 59/36* (2013.01); *F16H 59/48* (2013.01); *F16H 59/78* (2013.01); *F16H 2059/366* (2013.01); *F16H 2061/0234* (2013.01); *F16H 2306/14* (2013.01); *Y02T 10/56* (2013.01); *Y02T 10/84* (2013.01); *Y10S 903/945* (2013.01)

(58) Field of Classification Search
CPC ......... B60W 2540/10; B60W 2540/12; B60W 2710/1005; B60W 2710/1038; F16H 61/0213; F16H 59/36; F16H 59/48; F16H 59/78; F16H 2059/366; F16H 2061/0234; Y02T 10/56; Y02T 10/84; Y10S 903/945
See application file for complete search history.

(56) References Cited

U.S. PATENT DOCUMENTS

| | | | |
|---|---|---|---|
| 2001/0056007 A1* | 12/2001 | Yeo | F16H 61/0213 477/121 |
| 2007/0105679 A1 | 5/2007 | Tabata et al. | |
| 2009/0036263 A1* | 2/2009 | Iwase | B60K 6/365 477/3 |
| 2009/0203481 A1* | 8/2009 | Nohara | B60W 20/10 475/150 |
| 2010/0173746 A1 | 7/2010 | Ideshio et al. | |
| 2011/0174559 A1* | 7/2011 | Saito | B60K 6/48 180/65.27 |
| 2012/0123621 A1* | 5/2012 | Kishi | B60K 6/48 701/22 |
| 2013/0166131 A1* | 6/2013 | Shiiba | B60K 6/365 701/22 |
| 2014/0236437 A1* | 8/2014 | Toyota | B60K 6/36 701/58 |

OTHER PUBLICATIONS

English translation of Chinese Office Action received for CN Application No. 2015800096929, dated Nov. 1, 2017, 9 pages.

* cited by examiner

POWER REGENERATION OPTIMIZATION IN A HYBRID VEHICLE

CROSS-REFERENCE TO RELATED APPLICATION

This application is a U.S. national stage application claiming the benefit of International Application No. PCT/US2015/017106, filed on Feb. 23, 2015, which claims the benefit of and priority to U.S. Provisional Patent Application No. 61/944,375, entitled "POWER REGENERATION OPTIMIZATION IN A HYBRID VEHICLE," filed Feb. 25, 2014. Both applications are incorporated herein by reference in their entirety.

BACKGROUND

Conventional hybrid engine systems generally include both an electric motor and an internal combustion engine that are capable of powering the drivetrain in order to propel the car. A hybrid vehicle can have various configurations. For example, in a parallel configuration both the electric motor and the internal combustion engine are operably connected to the drivetrain/transmission to propel the vehicle. In a series configuration, the electric motor is operably connected to the drivetrain/transmission and the internal combustion engine indirectly powers the drivetrain/transmission by powering the electric motor.

In these configurations, the electric motor, which may also function as a generator, is connected to the input shaft of the transmission (i.e., engine side of the transmission) as opposed to the output shaft of the transmission (i.e., the wheel side or power delivery side of the transmission). Thus, during regenerative braking, the gears in the transmission directly affect the rotation speed of the electric motor/generator because the electric motor/generator is operably connected to the input shaft of the transmission. In other words, the electric motor/generator is on the opposite side of the transmission from the wheels and thus the transmission governs the rotation speed of the electric motor/generator during regenerative braking.

In conventional vehicle systems, a transmission control unit controls the gear shifting and general operation of the transmission. Conventional transmission control units are configured and tuned to automatically shift gears without considering the effect that a gear shift may have on the ability of the electric motor/generator to produce electricity. Thus, downshifting and/or other shifting events during a regenerative braking procedure may cause the electric motor/generator to rotate at speeds that are outside optimal efficiency ranges or outside specific operability ranges. In such situations, not only is the efficiency of the power regeneration technique diminished, the electric motor/generator may be damaged as it operates outside generally recommended speed ranges. Further, conventional transmission controllers may cause the transmission to repeatedly, although temporarily, disengage the generator from the wheels, thus repeatedly sacrificing time that could otherwise be spent generating electricity.

SUMMARY

One example embodiment relates to a hybrid controller unit including a detection module configured to detect a deceleration event; a gear-hold module configured to determine whether a certain gear of a transmission should be maintained for a certain period of time in order to optimize power regeneration during the deceleration event, wherein the gear-hold module generates a gear-hold request; a gear-skip module configured to determine whether the transmission should skip a gear in order to optimize power regeneration during the deceleration event, wherein the gear-skip module generates a gear-skip request; and an optimizing module configured to receive the gear-hold request and the gear-skip request and generate a transmission command to be sent to a transmission control unit for actuation.

Another embodiment relates to an apparatus. The apparatus includes a detection module, a gear-hold module, a gear-skip module, and an optimizing module. The detection module is structured to detect a deceleration event in a hybrid vehicle. The gear-hold module is structured to generate a gear-hold request, the gear-hold request structured to maintain a current gear of a transmission for the hybrid vehicle for a gear-hold duration responsive to the detection of the deceleration event. The gear-skip module is structured to generate gear-skip request, the gear-skip request including a downshift gear destination for the transmission responsive to the detection of the deceleration event. The optimizing module is structured to generate a transmission command for use with the transmission, wherein the transmission command is based on at least one of the gear-skip request and the gear-hold request.

Still another example embodiment relates to a system for optimizing power regeneration in a hybrid vehicle, the system includes a crankshaft of an engine; a wheel axle; a transmission comprising an engine side and a wheel side, wherein the engine side is operably connected to the crankshaft and the wheel side is operably connected to the wheel axle; a motor generator operably connected to the engine side of the transmission; a hybrid controller unit configured to detect a wheel axle deceleration event and create a transmission command based on factors comprising optimizing power regeneration at the motor generator; and a transmission controller unit configured to receive the transmission request and send actuation commands to the transmission.

Yet another embodiment relates to a vehicle. The vehicle includes an engine including a crankshaft; a transmission including an engine side and a wheel side, wherein the engine side is operably connected to the crankshaft and the wheel side is operably connected to a wheel axle; a motor generator operably connected to the engine side of the transmission; and a hybrid controller communicably coupled to the engine and the transmission. The hybrid controller is structured to: detect a deceleration event for the vehicle; detect a current gear of the transmission responsive to the detection of the deceleration event; and generate a transmission request responsive to the detection of the deceleration event, wherein the transmission request includes at least one of a gear-hold request and a gear-skip request, wherein each of the gear-hold request and the gear-skip request are structured to increase power regeneration of the motor generator. According to one embodiment, the vehicle includes a transmission controller. The transmission controller is structured to receive the transmission request and send an actuation command to the transmission based on the transmission request.

Still another example embodiment relates to a method for controlling a transmission, the method includes detecting a deceleration event; generating a gear-hold request by determining whether a certain gear of a transmission should be maintained for a certain period of time in order to optimize power regeneration during the deceleration event; generating a gear-skip request by determining whether the transmission should skip a gear in order to optimize power regeneration during the deceleration event; generating a transmission command by combining the gear-hold request and the gear-skip request; and actuating the transmission according to the transmission command.

A further embodiment relates to a method. The method includes detecting a deceleration event in a vehicle; generating a gear-hold request responsive to the detection of the deceleration event, the gear-hold request structured to maintain a current gear of a transmission for the vehicle for a gear-hold duration; generating gear-skip request responsive to the detection of the deceleration event, the gear-skip request including a downshift gear destination relative to the current gear for the transmission; generating a transmission command by combining the gear-hold request and the gear-skip request; and actuating the transmission according to the transmission command with the transmission of the vehicle.

The present inventions further relate to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the inventions described herein.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

The subject matter of the present disclosure has been developed in response to the present state of the art. Accordingly, the subject matter of the present disclosure has been developed to provide an apparatus, system, and method for safely and efficiently administering neurotoxin injections that overcomes many or all or some shortcomings in the prior art.

Figure 1:
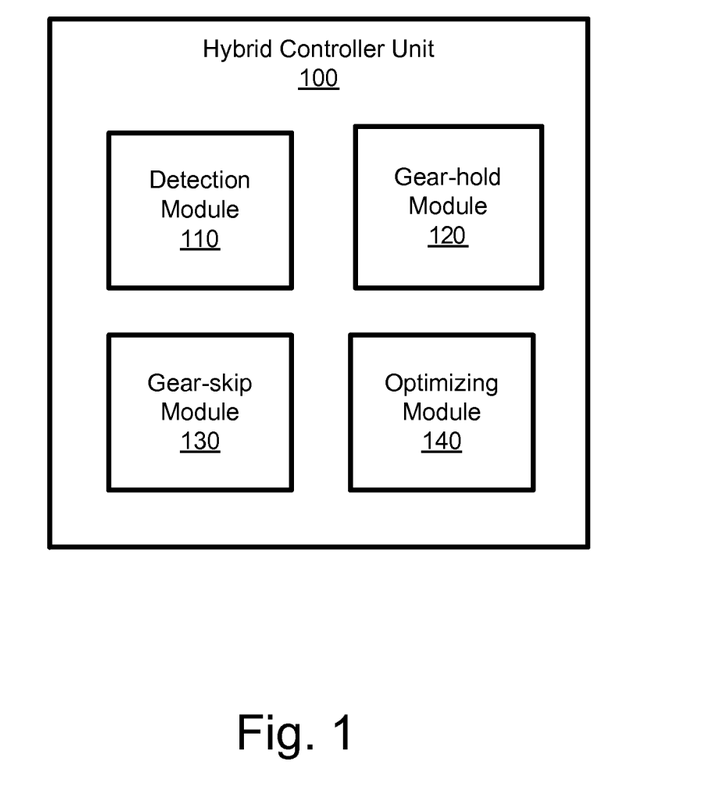
FIG. 1 is a schematic block diagram of a hybrid controller unit for optimizing power regeneration in a hybrid vehicle, according to one embodiment.

Reference throughout this specification to features, advantages, or similar language does not imply that all of the features and advantages that may be realized with the subject matter of the present disclosure should be or are in any single embodiment of the subject matter. Rather, language referring to the features and advantages is understood to mean that a specific feature, advantage, or characteristic described in connection with an embodiment is included in at least one embodiment of the subject matter of the present disclosure. Thus, discussion of the features and advantages, and similar language, throughout this specification may, but do not necessarily, refer to the same embodiment.

Furthermore, the described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

Similarly, reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

FIG. 1 is a schematic block diagram of a hybrid controller unit 100 (also referred to as a "hybrid controller" herein) for optimizing power regeneration in a hybrid vehicle, according to one embodiment. As depicted, the hybrid controller unit 100 may include a detection module 110, a gear-hold module 120, a gear-skip module 130, and an optimizing module 140. These modules are briefly described immediately below, while a more detailed description is included with reference to FIGS. 2 and 3.

The detection module 110 is configured to detect a deceleration event. Once a deceleration event is detected, the detection module 110 notifies both the gear-hold module 120 and the gear-skip module 130. Detection of a deceleration event may be based on a variety of different operating conditions including, but not limited to, a brake pedal depression duration being at or above a brake depression time threshold, a reduction in accelerator pedal depression being at or above a threshold accelerator pedal depression reduction amount, a reduction in fueling for the engine being at or above a threshold fueling reduction amount, an engine speed reduction being at or above a threshold engine speed reduction, etc. For example, an operator of a vehicle may momentarily tap the brake pedal, but this does not correspond to a deceleration event. Rather, the operator has to depress the brake pedal for a period of time that is more than momentary (e.g., at or above the brake pedal depression time threshold) for the detection module 110 to determine a deceleration event is occurring. In a similar example, rather than a brake pedal depression time amount, the detection module 110 may utilize a depression amount. As many brake pedals provide little actual braking during an initial depression amount, the amount may be predefined to trigger a determination of a deceleration event occurring by the detection module 110. In another example, the detection module 110 may utilize accelerator pedal position to determine if a deceleration event is occurring (e.g., a deceleration event exists if the accelerator pedal is not depressed for more than three (3) seconds to avoid an operator's foot slipping off of the accelerator pedal and an incorrect determination occurring, etc.). In still another example, a reduction in fueling commanded from a fuel injector that exceeds a reduction threshold amount (to avoid incorrect determinations from momentary reductions) may also correspond with the detection module 110 determining a deceleration event is occurring. Finally, as mentioned above in regard to the non-exhaustive list, another example may be if the engine speed drops below a threshold reduction amount from a previous current engine speed (e.g., a time immediately preceding the initial engine speed reduction). It should be appreciated that many other data points may be used by the detection module 110 to determine whether a deceleration event exists (e.g., load on the vehicle, etc.), such that the aforementioned list is not meant to be exhaustive. Therefore, the present disclosure contemplates other processes and procedures that may be used to determine the existence of a deceleration event, with such processes and procedures intended to fall within the spirit and scope of the present disclosure.

The gear-hold module 120 is configured to determine whether a certain gear of a transmission should be maintained for a certain period of time in order to optimize power regeneration during the deceleration event. Accordingly, the gear-hold module 120 then generates a gear-hold request that is sent to the optimizing module 140. The gear-skip module 130 is configured to determine whether the transmission should skip a gear in order to optimize power regeneration during the deceleration event. The gear-skip module 130 then generates a gear-skip request that is sent to the optimizing module 140. The optimizing module 140 is configured to receive the gear-hold request and the gear-skip request and generate a transmission command that is sent to the transmission for actuation. Further details regarding the hybrid controller unit 100 and the included modules 110, 120, 130, 140 are included below.

Figure 2:
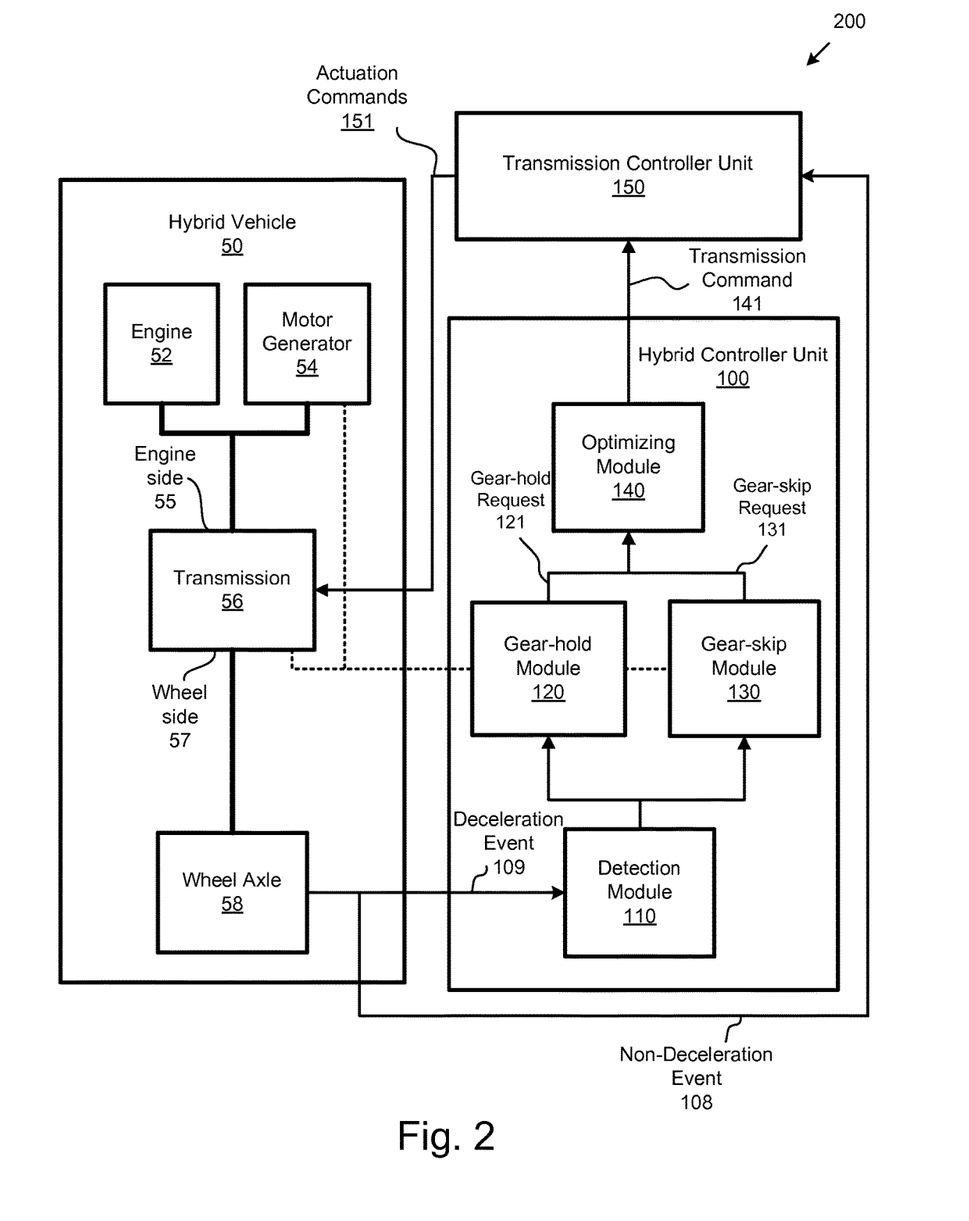
FIG. 2 is a schematic block diagram of a system for optimizing power regeneration in a hybrid vehicle, according to tone embodiment.

FIG. 2 is a schematic block diagram of a system 200 for optimizing power regeneration in a hybrid vehicle 50, according to one embodiment. The system 200 includes a hybrid vehicle 50 that has an engine 52, a motor generator 54, a transmission 56, and a wheel axle 58. The system 200 also includes a hybrid controller unit 100 that has the modules described briefly above, specifically a detection module 110, a gear-hold module 120, a gear-skip module 130, and an optimizing module 140. Still further, the system 200 also includes a transmission controller unit 150.

The engine 52 may be any internal combustion engine, such as a spark-ignited gasoline engine or a compression ignited diesel engine. The engine 52 has a crankshaft (not depicted) that converts the linear motion of the cylinders into a rotational motion about the crankshaft. Although not depicted, the engine 52 may include other components as conventionally implemented in internal combustion engines. The motor generator 54 may be any conventional motor/generator that is capable generating electricity. Although termed a 'motor generator' 54 throughout the pages of the disclosure, thus implying its ability to operate as both a motor and a generator, it is contemplated that the motor generator component, in some embodiments, may be an electric generator separate from the electric motor of the hybrid vehicle 50. The engine 52 and the motor generator 54 are operably connected to the engine side 55 of the transmission 56.

Although not depicted, various components may be interposed between the transmission 56 and the engine 52 or motor generator 54. For example, the engine 52 and/or the motor generator 54 may be connected to the input shaft (engine side 55) of the transmission via a gearing assembly. Additionally, the system 200 may include a clutch assembly or a torque converter interconnected between the transmission 56 and the engine 52. In yet another embodiment, the gearing assembly, clutch assembly, torque converter, and/or other interposed components may actually be integrated with either the engine 52 or the transmission 56 rather than being independent, stand-alone components.

The transmission 56, according to one embodiment, is an automatic transmission with multiple gears. The gears may have specific gear ratios that are selected according to a given application. The transmission 56, as described above, has an engine side 55 (i.e., input shaft) and a wheel side 57 (i.e., output shaft). A wheel axle 58 is operably connected to the wheel side 57 of the transmission 56. There may be additional components, not depicted, that are interposed between the wheel side 57 of the transmission and the wheel axle 58. For example, a differential may be employed to transmit the torque to the wheel axle 58. In one embodiment, the wheel axle 58 may be a single axle, such as a front axle of an automobile. In another embodiment, the term 'wheel axle' 58 may refer to multiple axles, such as a front and a rear axle of an automobile, and the transmission 56 may deliver power to multiple axles (i.e., four wheel drive automobile).

The hybrid controller unit 100 depicted in FIG. 2 includes a detection module 110, a gear-hold module 120, a gear-skip module 130, and an optimizing module 140. As described briefly above, the detection module 110 is configured to sense when the vehicle is decelerating (i.e., detect a deceleration event 109) so that a regenerative braking procedure may be implemented to recover some energy. When the vehicle is not in a regenerative braking scenario (i.e., when there is a non-deceleration event 108), the transmission controller unit 150 controls the shifting strategy and sends actuation commands 151 to the transmission accordingly.

Regenerative braking is the conversion of otherwise wasted thermal energy, dissipated as heat at the brakes, into electrical energy. The deceleration event 109 may be caused by a driver depressing the brake pedal to slow the vehicle or the deceleration event 109 may be the mere coasting of the vehicle while still in gear. In one embodiment, the detection module 110 may include sensors and/or physical indicators that detect the actual speed of the wheel axle 58. In another embodiment, the detection module 110 may detect a deceleration event 109 by receiving such information from the main electronic control module (ECM) of the vehicle. In one embodiment, the detection module 110 constantly monitors and reports the speed of the wheel axle 58 to the hybrid controller unit 100, even during deceleration events. In another embodiment, the detection module 110 is configured to only report the commencement and conclusion of a deceleration event 109.

The gear-hold module 120 receives the alert/notice from the detection module 110 regarding the state of the wheel axle 58. During deceleration events 109, the gear-hold module 120 analyzes the dynamic condition of the system 200 and determines whether the transmission 56 should stay in a certain gear for a certain period of time. For example, when the vehicle is decelerating, a conventional transmission controller unit 150 would downshift the transmission 56 according to conventional speed mapping tables. However, the present disclosure relates to a hybrid controller unit 100 that does not (necessarily) refer to conventional speed mapping tables but instead determines whether the transmission 56 should remain in the presently engaged gear for a longer period of time in order to lengthen the cumulative time during which the wheel axle 58 is engaged with the motor generator 54.

In other words, the gear-hold module 120 has dynamic speed mapping tables that are biased in favor of maintaining the transmission 56 in the present gear in order to optimize the electricity production of the motor generator 54. In one embodiment, as depicted in FIG. 2, the system 200 may include dotted communication lines between the gear-hold module 120 and both the transmission 56 and the motor generator 54. The dotted communication lines represent the ability of the gear-hold module 120 to perceive the dynamic condition of the transmission 56 and/or the motor generator 54 in order to determine whether the transmission 56 should hold in the present gear. The gear-hold module 120 generates a gear-hold request 121 that is sent to the optimizing module 140 (described below).

The gear-hold request 121 is structured to maintain a current gear of a transmission 56 for the vehicle for a gear-hold duration responsive to the detection of the deceleration event. Accordingly, the gear-hold module 120 may provide the gear-hold request 121 to the optimizing module 140 that provides the gear-hold request to a transmission control unit 150 for actuation with the transmission 56.

The gear-hold duration is highly configurable and may vary based on the application. According to one embodiment, the gear-hold duration refers to a predefined amount of time. The predetermined amount of time may be an absolute amount of time following detection of the deceleration event. For example, the predetermined amount of time may be five (5) seconds, such that after the deceleration event is detected, the current gear is maintained (prior to a shifting event) for at least five seconds. The predetermined amount of time may be an additional amount of time after a conventional speed mapping table would ordinarily call for a shift event to occur (e.g., two (2) seconds after the shift would normally occur). This ensures that the current gear is engaged for a relatively longer duration of time than conventional systems, which helps to increase the power regeneration capability of the present disclosure over the conventional systems.

According to another embodiment, the gear-hold duration refers to a predefined load being is detected (e.g., by the detection module 110). The "load" refers to the load experienced by the vehicle. The load may be determined by any type of load determination methods, such as a load sensor (e.g., an accelerometer, etc.) or one or more algorithms based on acquired and known data (e.g., grade data, weight of the vehicle, speed of the vehicle, etc.). If the load detected is at or above a predetermined threshold, then a downshift event may be permitted. For example, if the vehicle is travelling uphill and the load is increasing while the speed is decreasing (i.e., a deceleration event) due to the grade, the hybrid control unit 100 of the present disclosure is structured to maintain the current gear until a load threshold is reached. At this point, a downshift may be needed or substantially needed in order to maintain a vehicle speed within predefined allowed limits relative to a previous vehicle speed before the hill was encountered. In this regard, the speed is restricted from decreasing too much to adversely affect drivability of the vehicle. However, the extended gear-hold increases the power regeneration of the motor generator 54 relative to the conventional systems.

According to still another embodiment, the gear-hold duration refers to a thermal threshold being reached for the motor generator 54. Accordingly, the motor generator 54 may include one or more temperature sensors that are communicably coupled to the hybrid controller unit 100. By operating contrast to conventional systems to maintain a current gear (after detection of the deceleration event) for a relatively longer period of time, the motor generator remains engaged for an increased amount of time. This engagement may cause heat and heat may adversely affect the motor generator 54. Accordingly, to prevent or substantially prevent unnecessary wear and tear, the gear-hold duration is only until a predefined temperature threshold is reached by the motor generator 54. In this regard, because different types of motor generators may be used in a variety of hybrid or electric vehicles, the predefined temperature threshold may vary based on the application.

According to yet another embodiment, the gear-hold duration is until at least one of a predefined engine speed and a hybrid vehicle speed is reached relative to the current engine speed and vehicle speed, respectively, when the deceleration event is detected. In this regard, a maximum or allowed percent reduction may be defined. As different engine and vehicle speeds may correspond with different transmission settings, by prescribing a certain reduction in (vehicle or engine) speed, the hybrid controller unit 100 better accommodates the dynamics of the system to ensure substantially efficient operation. For example, to maintain a current gear from forty (40) miles-per-hour to five (5) miles-per-hour may cause an undesirable amount of wear and tear on the vehicle despite the power regeneration capabilities. Accordingly, the hybrid control unit 100 recognizes the limits of the system to prescribe a (engine or vehicle) speed reduction within the various constraints of the system.

According to another embodiment, the gear-hold duration is until at least one of a speed and a power threshold is reached for the motor generator 54. In certain motor generator embodiments, a constant power is produced for speeds above a threshold. This threshold represents a transition point from (substantially) constant torque operation to (substantially) constant power operation for the motor generator. To facilitate a relatively larger power regeneration by the motor generator 54, the gear-hold is structured to last until a constant power operation mode no longer exists. In certain embodiments, this gear-hold duration cessation point may be based on motor generator speed (at speeds above the transition point speed, there is constant power from the motor generator; at speeds below the transition point speed, there is constant torque). One or more speed sensors may be included with the motor generator 54 and communicably coupled to the hybrid controller unit 100, such that the hybrid controller unit 100 may in near real-time monitor when the transition speed of the motor generator 54 is reached following detection of the deceleration event. Advantageously, this embodiment substantially ensures that a relatively greater power regeneration is experienced by the motor generator 54. In contrast, conventional systems may require a shift event while the motor generator is engaged at a speed above the transition point (e.g., where there is constant power). In this situation, the ability to regenerate power is lost by the conventional system. According to the present disclosure, the hybrid controller unit 100 provides the gear-hold duration until the transition point (e.g., speed of the motor generator) to facilitate an increase in power regeneration over conventional systems.

In another embodiment, the gear hold duration may be based on a reduction amount in the motor generator 54 speed relative to the speed of the motor generator 54 when the deceleration event is detected. For example, if the speed of the motor generator is X revolutions-per-minute, the gear-hold duration is X minus twenty (20) percent of X. In other words, the gear duration lasts until the speed is reduced by at least twenty-percent. In on embodiment, the percent reduction may be an addition to a conventional speed mapping table (e.g., five (5) percent). For example, if the conventional speed mapping calls for a downshift event due to an engine or vehicle speed, the hybrid controller unit 100 acquires data indicative of the current motor generator speed at this speed and then provides a command to the transmission control unit to maintain the current gear until the speed of the motor generator decreases by an additional five percent. This ensures that the motor generator and transmission are engaged for a relatively longer period of time relative to conventional systems in order to increase the power regeneration capability of the present disclosure.

In still a further embodiment, the gear-hold duration is until a charge level is reached relative to an initial charge level of a battery in the hybrid vehicle when the deceleration event is detected. For example, a predefined fifteen percent increase in initial charge level may be used as the gear-hold stoppage point (when a downshift event is permitted to occur). In this regard, the transmission and motor generator are engaged for the generator to generate a charge to that threshold. Of course, other constrains may be implemented with this embodiment such that the gear-hold duration does not compromise the any of the vehicle components. Nonetheless, by prescribing a charge level increase, the hybrid controller of the present disclosure may substantially ensure that power regeneration occurs to at least a certain level. In another embodiment, the hybrid controller may use an additional amount relative to when the conventional system would ordinarily call for the downshift event to occur (e.g., increase the state of charge by five percent to maintain engagement of the motor generator and the transmission for an additional amount of time relative to conventional systems to this amount is reached).

Therefore, as seen above, defining the gear-hold duration to increase power regeneration of the motor generator is highly variable. The aforementioned description is illustrative of only a few examples, such that others are possible, with all such other possibilities intended to fall within the spirit and scope of the present disclosure. Moreover, as will be readily appreciated by those of ordinary skill in the art, while the examples are described above in isolation, it should be understood that more than one factor (e.g., temperature threshold and engine speed reduction, etc.) may be used together to further control the gear-hold duration.

The gear-skip module 130, which is similar in general purpose to the gear-hold module 120, receives the alert/notice from the detection module 110 regarding the state of the wheel axle 58. During deceleration events 109, the gear-skip module 130 analyzes the dynamic condition of the system 200 and determines whether the transmission 56 should skip a gear during a downshift operation. For example, when the vehicle is decelerating, a conventional transmission controller unit 150 would downshift the transmission 56 according to conventional speed mapping tables. However, the present disclosure relates to a hybrid controller unit 100 that does not necessarily refer to conventional speed mapping tables but instead determines whether the transmission 56 should skip a gear when downshifting in order to avoid the repeated disengagement of the wheel axle 58 from the motor generator 54, thus wasting time during which the motor generator 54 would have been able to generate electricity. By skipping a gear during downshifting, the wheel axle 58 stays engages with the motor generator 54 (via the transmission 56) for a longer cumulative time, thus increasing the electricity generated during a deceleration event (e.g., regenerative braking)

In other words, the gear-skip module 130 has dynamic speed mapping tables that are biased in favor of skipping an immediately lower gear and jumping to a gear at least two lower than the current gear. In one embodiment, as depicted in FIG. 2, the system may include dotted communication lines between the gear-skip module 130 and both the transmission 56 and the motor generator 54. The dotted communication lines represent the ability of the gear-skip module 130 to perceive the dynamic condition of the transmission 56 and/or the motor generator 54 in order to determine whether the transmission 56 should skip a gear. The gear-skip module 130 generates a gear-skip request 131 that is sent to the optimizing module 140 (described below).

Accordingly, the gear-skip request 131 includes a downshift gear destination for the transmission responsive to the detection of the deceleration event. As mentioned above, in one embodiment, the downshift gear destination is at least two gears lower than the current gear of the transmission when the deceleration event is detected.

According to another embodiment, the downshift gear destination is based on a maximum predefined current gear to downshift gear destination difference. For example, if the current vehicle gear is sixth gear and the maximum permitted difference is three gears and the minimum permitted difference is two gears, then the downshift gear destination is either fourth gear or third gear. As mentioned above, by skipping at least one gear, the motor generator 54 and transmission 56 remain engaged for a relatively longer period of time thereby increasing the power regeneration capabilities of the motor generator 54 following detection of the deceleration event.

According to still another embodiment, the downshift gear destination is based on the motor generator 54 speed after a shift to the downshift gear destination. For example, if the downshift gear destination corresponds with a motor generator speed that exceeds the current motor generator by more than an acceptable amount (or, in some embodiments, a threshold speed limit for the motor generator), that downshift gear destination may be refused. For example, suppose the current gear is fifth (5) gear and the gear-skip request 131 includes second (2) and third (3) gears as potential downshift gear destinations. However, a transition to second (2) gear from fifth (5) would cause a corresponding a reduction in speed to the motor generator past the transition speed (described above). A transition to third (3) gear from fifth (5) gear would maintain the motor generator speed above the transition speed. In this case, the optimizing module 140 would provide a transmission command to reflecting the downshift destination of third (3) gear and not second (2) gear. In this configuration, the hybrid controller unit 100 is structured to substantially maintain the motor generator 54 in a constant power operating mode for as long as possible, without transitioning into a constant torque range, in order to maximize the power regeneration of the system without diminishing returns.

According to yet another embodiment, the downshift gear destination is based on an engine speed prior to a shift to the downshift gear destination. As the engine speed is decreasing responsive to the deceleration event, wear or damage could occur if the engine speed is not matched with an acceptable transmission setting. For example, the gear-hold request 121 may maintain the current gear for a certain amount of time while the engine speed is decreasing. The hybrid controller unit 100 receives data indicative of the engine speed after expiration of the certain amount of time. In turn, the gear-skip request 131 is based on the data indicative of the engine speed. Utilizing the gear-hold facilitates a relatively longer engagement between the motor generator 54 and the transmission 56 to increase the power regeneration capability, while taking into account the engine speed, the gear-skip request facilitates a transmission event in substantial accordance with the designed system limits.

Similar to the gear-hold duration, it should be understood that many other parameters may be used to define the gear-skip request 131. All such variations are intended to fall within the spirit and scope of the present disclosure.

Although the gear-hold module 120 and the gear-skip module 130 are depicted as parallel modules, it is anticipated that the gear-hold module 120 and the gear-skip module 130 may be in series. In other words, in one embodiment the gear-hold module 120 may determine a period of time during which the transmission holds in the current gear and the gear-hold module 120 may send a gear-hold request to the gear-skip module 130. The gear-hold module 130 may then determine whether a gear should be skipped after the certain gear holding time has passed. The gear-skip module 130 may then send a gear-skip request 131 to the optimizing module 140, wherein the gear-skip request 131 includes both the gear-hold information and the gear-skip information. Alternatively in another embodiment, the two modules may actually be integrated into the same module that determines the holding time and the skipping technique to be requested of the transmission 56.

The optimizing module 140 receives the gear-hold request 121 and the gear-skip request 131 and generates a transmission command 141 based on at least one of the gear-hold request 121 and the gear-skip request 131 that is sent to the transmission controller unit 150. The transmission command 141 may include one or both a gear holding parameter and a gear skipping technique. In another embodiment, the optimizing module 140 may determine that only one or the other of the gear holding parameter and the gear skipping technique are to be sent to the optimizing module 140. In other words, the optimizing module 140 combines the requests from the two gear modules 120, 130 and selects the optimal transmission command 141 to be sent to the transmission controller unit 150 (also referred to as the "transmission controller"). The optimizing module 140 may consider parameters, such as drivability and transmission limits when determining a transmission command 141.

According to one embodiment, the hybrid controller is structured to provide both of the gear-hold request 121 and the gear-skip request 131 to the transmission controller 150, wherein the transmission controller is structured to actuate the gear-hold request first followed by the gear-skip request. In another embodiment, the hybrid controller is structured to provide the gear-skip request 131 after the gear-hold request is implemented. In this configuration, the gear-skip request 131 is responsive to the operating conditions of the system following the gear-hold request. This configuration may be utilized to substantially ensure that various systems limits are complied with or substantially complied (e.g., a maximum downshift skipping event, etc.).

As described above, the transmission controller unit 150 may be a conventional transmission controller that, without the presence of the hybrid controller unit 100, would control all operations of the transmission 56, even regenerative braking operations. In one embodiment, the system 200 may not include the transmission controller and the transmission command 141 generated by the optimizing module 140 is sent directly to the transmission 56. In one embodiment, the vehicle 50, the hybrid controller unit 100, and the transmission controller unit 150 may be substantially separate, as depicted. In another embodiment, the vehicle 50, the hybrid controller unit 100, and the transmission controller unit 150 may be integrated. In other words, the separate units and modules are depicted and described individually in order to clearly explain the functionality and general structure of the system 200 and are not intended as discrete, isolated, physical entities. Thus, the boundaries in the schematic box diagram of FIG. 2 are not intended as actual, physical boundaries. Thus, the hybrid controller unit 100 may actually be a subset of the transmission controller unit 150 (or vice versa).

Figure 3:
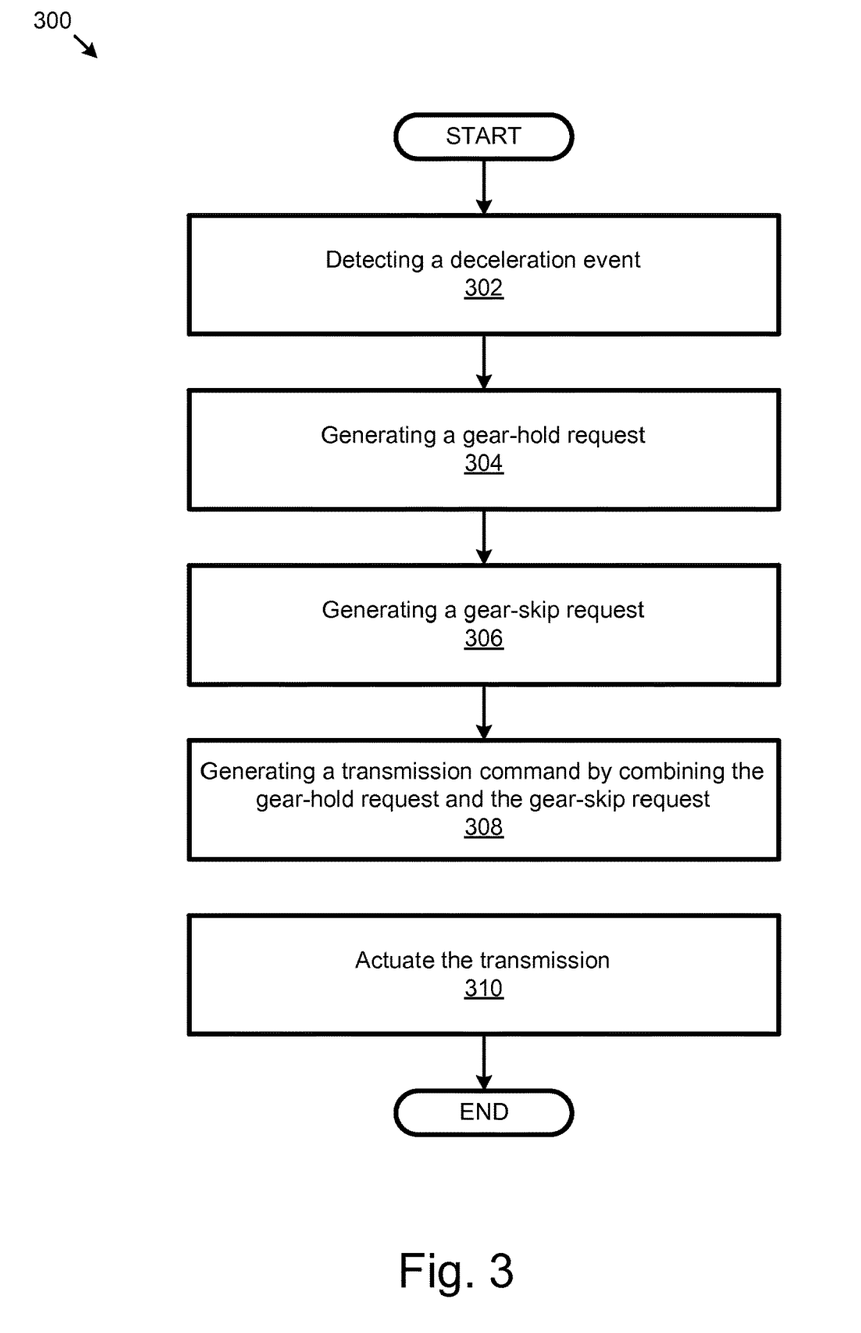
FIG. 3 is a schematic flow chart diagram of a method for optimizing power regeneration in a hybrid vehicle, according to one embodiment.

FIG. 3 is a schematic flow chart diagram of a method 300 for optimizing power regeneration in a hybrid vehicle 50, according to one embodiment. The method includes detecting a deceleration event at 302. The method 300 further includes generating a gear-hold request 121 by determining whether a certain gear of a transmission 56 should be maintained for a certain period of time in order to optimize power regeneration during the deceleration event 109 at 304. Still further the method 300 includes generating a gear-skip request 131 by determining whether the transmission 56 should skip a gear in order to optimize power regeneration during the deceleration event 109 at 306. The method 300 also includes generating a transmission command 141 by combining the gear-hold request 121 and the gear-skip request 131 at 308. Finally, the method 300 includes actuating the transmission based on the transmission command 141 at 310. Similar reference numerals are used to describe method 300 to indicate that that the components referenced by those numerals may have the same or similar structure and function as the components described herein above.

In the above description, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented as machine-readable instructions for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented as machine-readable instructions (i.e., computer readable instructions/code), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus, comprising:
a detection circuit structured to detect a deceleration event in a hybrid vehicle;

a gear-hold circuit structured to generate a gear-hold request, the gear-hold request structured to maintain a current gear of a transmission for the hybrid vehicle for a gear-hold duration including a predefined amount of time, responsive to the detection of the deceleration event;

a gear-skip circuit structured to generate gear-skip request, the gear-skip request including a downshift gear destination for the transmission responsive to the detection of the deceleration event; and an optimizing circuit structured to generate a transmission command for use with the transmission, wherein the transmission command is based on at least one of the gear-skip request and the gear-hold request.

2. The apparatus of claim 1, wherein the gear-hold duration is until a predefined load for the hybrid vehicle is detected by the detection circuit.

3. The apparatus of claim 1, wherein the gear-hold duration is until a thermal threshold is reached for an electric generator of the hybrid vehicle.

4. The apparatus of claim 1, wherein the gear-hold duration is until at least one of a predefined engine speed and a hybrid vehicle speed is reached.

5. The apparatus of claim 1, wherein the gear-hold duration is until at least one of a speed and a power threshold is reached for an electric motor generator of the hybrid vehicle.

6. The apparatus of claim 5, wherein the power threshold is a transition point between constant power and constant torque for the electric motor generator.

7. The apparatus of claim 1, wherein the gear-hold duration is until a charge level is reached relative to an initial charge level of a battery in the hybrid vehicle when the deceleration event is detected.

8. The apparatus of claim 1, wherein the downshift gear destination is at least two gears lower than the current gear of the transmission when the deceleration event is detected.

9. A vehicle, comprising:
a transmission including an engine side and a wheel side;
a motor generator operably connected to the engine side of the transmission;
a hybrid controller communicably coupled to the transmission, the hybrid controller structured to:
detect a deceleration event for the vehicle;
detect a current gear of the transmission responsive to the detection of the deceleration event; and
generate a transmission request responsive to the detection of the deceleration event, wherein the transmission request includes at least one of a gear-hold request including a predefined amount of time and a gear-skip request, wherein each of the gear-hold request and the gear-skip request are structured to increase power regeneration of the motor generator; and a transmission controller structured to receive the transmission request and send an actuation command to the transmission based on the transmission request.

10. The vehicle of claim 9, wherein the hybrid controller is structured to provide both of the gear-hold request and the gear-skip request to the transmission controller, wherein the transmission controller is structured to actuate the gear-hold request first followed by the gear-skip request.

11. The vehicle of claim 9, wherein the gear-skip request includes a downshift gear destination for the transmission.

12. The vehicle of claim 11, wherein the downshift gear destination is at least two gears lower than the current gear.

13. The vehicle of claim 12, wherein the downshift gear destination is based on at least one of a maximum predefined current gear to downshift gear destination difference, a motor generator speed after a shift to the downshift gear destination, and an engine speed prior to a shift to the downshift gear destination.

14. The vehicle of claim 9, wherein the detection of the deceleration event is based on at least one of a brake pedal depression duration being at or above a brake depression time threshold, a reduction in accelerator pedal depression being at or above a threshold accelerator pedal depression reduction amount, a reduction in fueling being at or above a threshold fueling reduction amount, and an engine speed reduction being at or above a threshold engine speed reduction.

15. The vehicle of claim 9, wherein the gear-hold duration is until at least one of a speed and a power threshold is reached for the motor generator.

16. A method, comprising:
detecting a deceleration event in a vehicle;
generating a gear-hold request responsive to the detection of the deceleration event, the gear-hold request structured to maintain a current gear of a transmission for the vehicle for a gear-hold duration including a predefined amount of time;
generating gear-skip request responsive to the detection of the deceleration event, the gear-skip request including a downshift gear destination relative to the current gear for the transmission;
generating a transmission command by combining the gear-hold request and the gear-skip request; and
actuating the transmission according to the transmission command with the transmission of the vehicle.

17. The method of claim 16, wherein the gear-hold request and the gear-skip request are structured to increase a power regeneration for a motor generator of the vehicle.

18. The method of claim 16, wherein the gear-hold duration is until at least one of a predefined engine speed and a predefined hybrid vehicle speed is reached.

19. The method of claim 16, wherein the downshift gear destination is at least two gears lower than the current gear of the transmission when the deceleration event is detected.

* * * * *